(12) United States Patent
Matsushima et al.

(10) Patent No.: US 8,497,675 B2
(45) Date of Patent: Jul. 30, 2013

(54) ANGLE DETECTOR

(75) Inventors: Tomohiro Matsushima, Shimada (JP); Yasuhiro Sugimori, Shimada (JP)

(73) Assignee: Yazaki Corporation, Tokyo (JP)

( * ) Notice: Subject to any disclaimer, the term of this patent is extended or adjusted under 35 U.S.C. 154(b) by 339 days.

(21) Appl. No.: 12/814,774

(22) Filed: Jun. 14, 2010

(65) Prior Publication Data

US 2011/0025314 A1 Feb. 3, 2011

(30) Foreign Application Priority Data

Jul. 30, 2009 (JP) ................................. 2009-177538

(51) Int. Cl.
*G01B 7/30* (2006.01)

(52) U.S. Cl.
USPC ................................................... 324/207.25

(58) Field of Classification Search
USPC ................................................... 324/207.25
See application file for complete search history.

(56) References Cited

U.S. PATENT DOCUMENTS

| 6,339,325 | B1 | 1/2002 | Oda et al. |
| 6,867,582 | B2 * | 3/2005 | Muraji et al. ............... 324/207.2 |
| 6,879,150 | B2 * | 4/2005 | Sekiya ..................... 324/207.25 |
| 2001/0020575 | A1 | 9/2001 | Sato et al. |

FOREIGN PATENT DOCUMENTS

| JP | 2000-179681 A | 6/2000 |
| JP | 2001-254812 A | 9/2001 |
| JP | 2003-194580 A | 7/2003 |
| JP | 2007-248275 A | 9/2007 |

OTHER PUBLICATIONS

Office Action, dated Jan. 29, 2013, issued by the Japanese Patent Office in counterpart Japanese Patent Application No. 2009-177538.
Office Action dated Apr. 16, 2013 issued by the Japanese Patent Office in counterpart Japanese Patent Application No. 2009-177538.

* cited by examiner

*Primary Examiner* — Reena Aurora
(74) *Attorney, Agent, or Firm* — Sughrue Mion, PLLC (57) ABSTRACT

An angle detector includes a rotating member, a housing, a detector and an urging member. The rotating member is rotatable with a shaft inserted therethrough. The housing rotatably supports the rotating member. The detector detects a rotating angle of the rotating member with respect to the housing. The urging member urges the rotating member in a rotating direction of the rotating member. An engagement portion is provided on the housing. An engaged portion is provided on the rotating member. The engaged portion is adapted to be brought into engagement with the engagement portion by urged by the urging member.

13 Claims, 14 Drawing Sheets

ANGLE DETECTOR

BACKGROUND

The present invention relates to an angle detector and more particularly to an angle detector for detecting a rotating angle of a shaft of an automatic transmission of a motor vehicle, for example.

The related angle detector 200 shown in FIGS. 11 to 14B is an angle detector for detecting a rotating angle of a shaft with respect to a transmission case of an automatic transmission of a motor vehicle, for example. The angle detector 200 includes a housing 204, a rotating member 206, a torsion coil spring 202, a magnetic sensor 208 and a permanent magnet 210.

Figure 11:
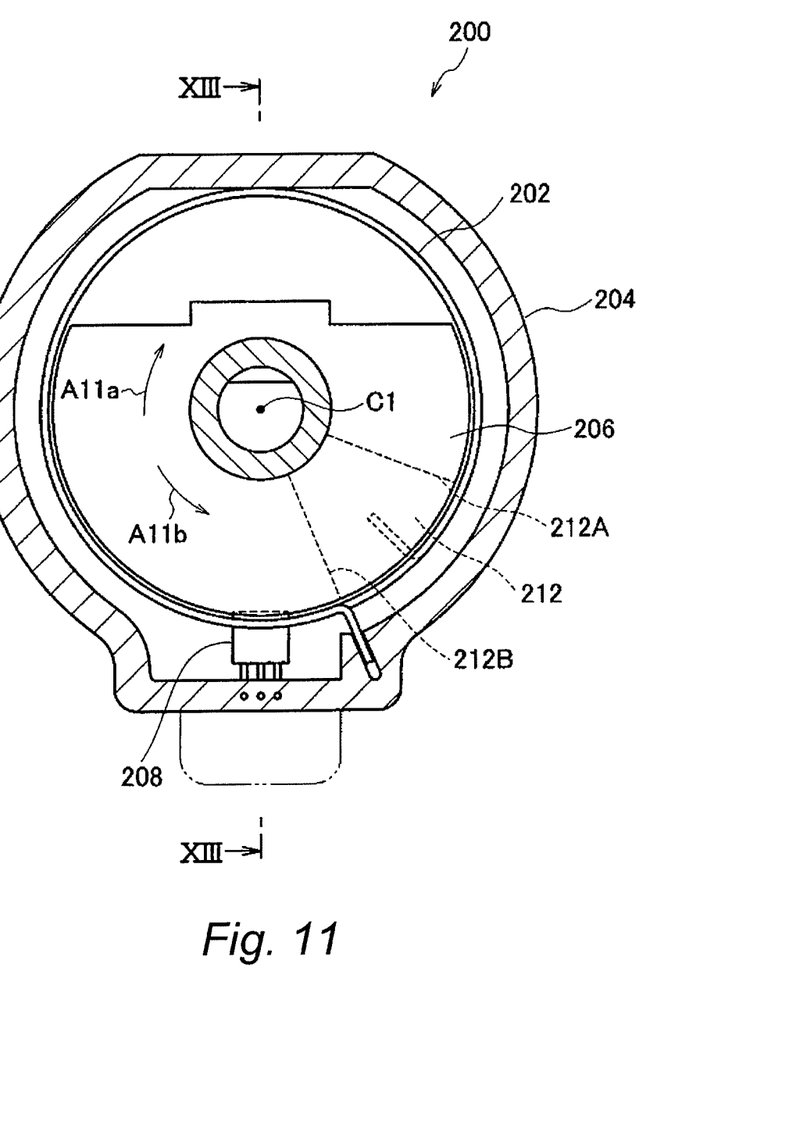
FIG. 11 is a sectional view showing a related angle detector.
Figure 12A:
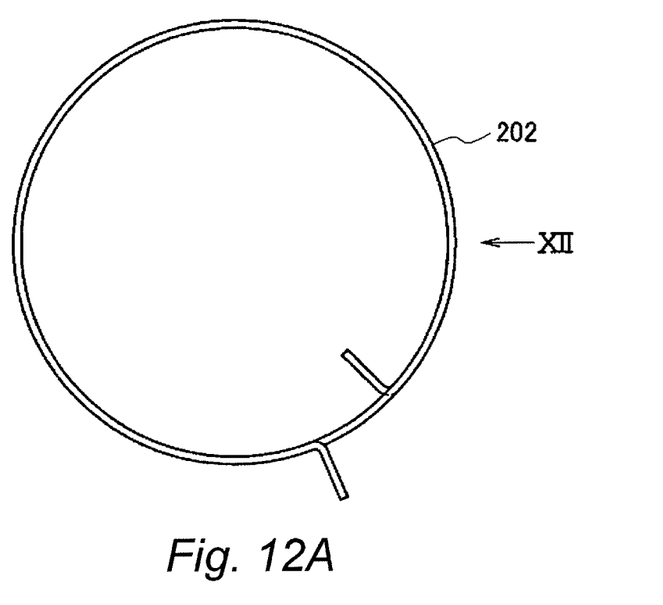
FIG. 12A a front view of a torsion coil spring used in the related angle detector shown in FIG. 11.
Figure 12B:
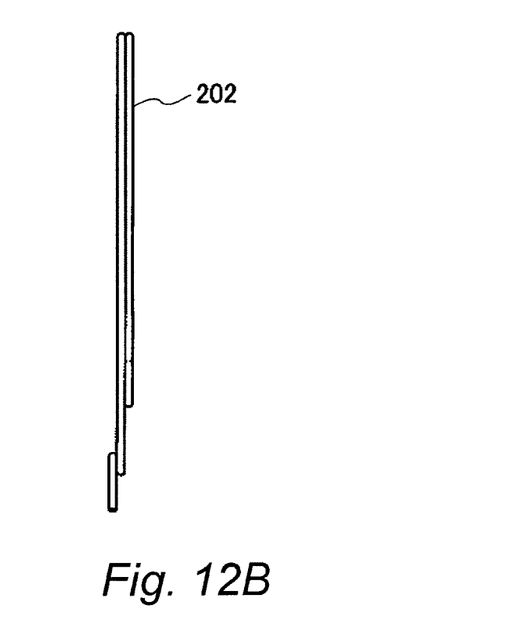
FIG. 12B is a side view of the torsion coil spring shown in FIG. 12A.
Figure 13:
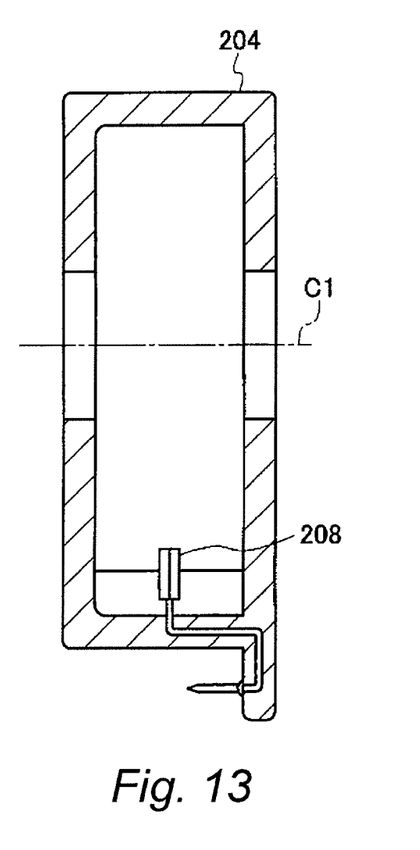
FIG. 13 is a sectional view of a housing of the related angle detector shown in FIG. 11 which is taken along the line XIII-XIII.
Figure 14A:
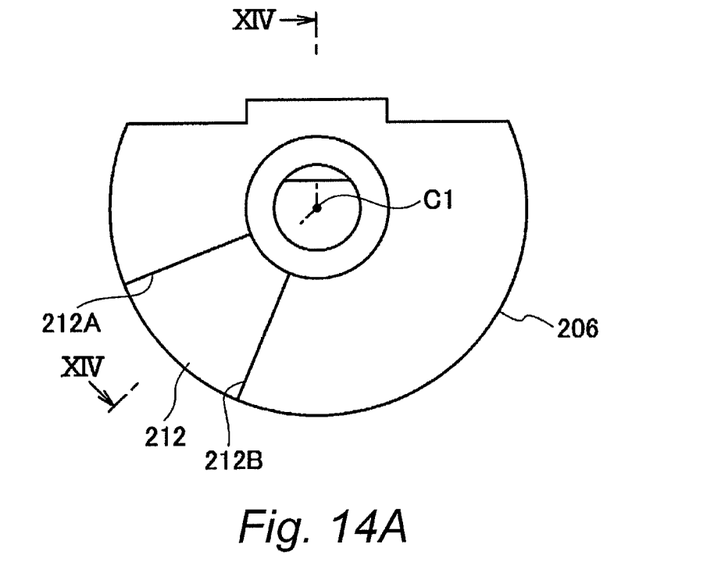
FIG. 14A is a front view of a rotating member which makes up the related angle detector shown in FIG. 11.
Figure 14B:
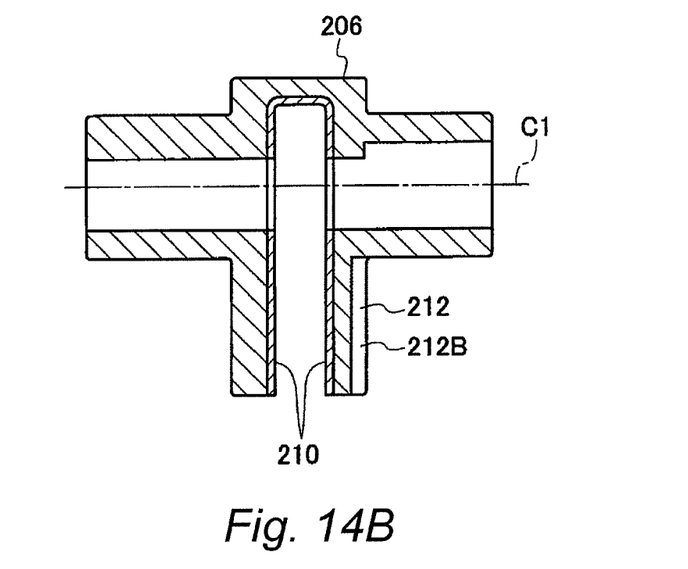
FIG. 14B is a sectional view showing a section taken along the line XIV-XIV in FIG. 14A.

The rotating member 206 is provided in the housing 204 so as to rotate about an axis C1 as a rotating center. The housing 204 is installed integrally on the transmission case of the automatic transmission and the rotating member 206 is integrally on the shaft of the automatic transmission. In this state, when the shaft rotates relative to the transmission case of the automatic transmission, the rotating member 206 is made to rotate relative to the housing 204. Then, by the permanent magnet 208 provided integrally on the rotating member 206 being detected by the magnetic sensor 208, a rotating angle of the shaft relative to the transmission case of the automatic transmission is detected.

The rotating member 206 is urged in its rotating direction by the torsion coil spring 202. One end portion of the torsion coil spring 202 enters a hole provided in the housing 204 so as to be installed integrally in the housing 204. The other end of the torsion coil spring 202 enters a fan-shaped recess portion 212 provided on the rotating member 206.

In the state shown in FIG. 11, the other end portion of the torsion coil spring 202 is situated in an intermediate position of the fan-shaped recess portion 212. Moreover, since there is exerted no external force on the torsion coil spring 202, the urging of the rotating member 206 by the torsion coil spring 202 is not implemented.

However, when the rotating member 206 rotates about the axis C1 in a direction indicated by an arrow A11a from the state shown in FIG. 11, the other end portion of the torsion coil spring 202 is brought into abutment with one side wall 212A of the recess portion 212. Then, when the rotating member 206 rotates further in the direction indicated by the arrow A11a from that state of abutment, the rotating member 206 is then urged in an opposite direction to the direction indicated by the arrow A11a (in a direction indicated by an arrow A11b). Similarly, when the rotating member 206 rotates about the axis C1 in the direction indicated by the arrow A11b from the state shown in FIG. 11, the other end portion of the torsion coil spring 202 is brought into abutment with the other side wall 212B of the recess portion 212, whereby the rotating member 206 is urged in the direction indicated by the arrow A11a.

Note that as patent documents on the related art, there can be raised Patent Document 1 and Patent Document 2, for example.

[Patent Document 1] Japanese Patent Publication Number 2000-179681
[Patent Document 2] Japanese Patent Publication Number 2001-254812

Incidentally, in the related angle detector 200, the rotating range of the rotating member 206 is controlled by use of the torsion coil spring 202. However, the other end portion (a lug-like portion) of the torsion coil spring 202 is not in integral engagement with the rotating member 206. Consequently, in the state shown in FIG. 11, the rotating member 206 is not urged by the torsion coil spring 202, and hence, the rotating member 206 is made free relative to the housing 204. Then, seeking the home position of the rotating member 206 needs to be implemented forcibly by the software of a control unit of a vehicle (a motor vehicle), leading to a problem that the home position seeking operation of the rotating member 206 becomes complex.

SUMMARY

It is therefore one advantageous aspect of the present invention to provide an angle detector for detecting a rotating angle of a shaft member which rotates relative to a housing which facilitates a home position seeking operation of a rotating member.

According to one aspect of the invention, there is provided an angle detector, comprising:
a rotating member configured to rotate with a shaft inserted therethrough;
a housing rotatably supporting the rotating member;
a detector configured to detect a rotating angle of the rotating member with respect to the housing;
an urging member urging the rotating member in a rotating direction of the rotating member;
an engagement portion provided on the housing; and
an engaged portion provided on the rotating member and configured to be brought into engagement with the engagement portion by urged by the urging member.

The angle detector may be configured such that: the rotating member is disposed in the housing so as to rotate within an angle range which is smaller than 360 degrees, the housing includes a main body portion and a lid portion, the engagement portion has a projection projected from an inner face of the housing, the engaged portion has a cutout formed on the rotating member, and the projection is configured to be inserted in the cutout, in a case where the rotating member is angled with respect to the housing within the angle range when the lid portion is attached to the main body portion.

The angle detector may be configured such that: the engagement portion has a cutout formed on an inner face of the housing, and the engaged portion has a projection projected from the rotating member.

The angle detector may be configured such that: the urging member includes a torsion coil spring, one end portion of the torsion coil spring is installed on the housing, and the other end portion of the torsion coil spring is installed on the rotating member.

The angle detector may be configured such that the other end portion of the torsion coil spring is fit in a hole formed on the rotating member parallel to a rotating axis of the rotating member.

DETAILED DESCRIPTION OF EXEMPLIFIED EMBODIMENTS

An angle detector 1 is an angle detector for detecting a rotating angle of a shaft member (shaft) 9 which rotates relative to a transmission case of an automatic transmission of a vehicle such as a motor vehicle relative to the transmission case. Note that there can be raised various shafts including a manual valve shaft, a transmission selector shaft, a throttle shaft and the like as the shaft above.

The angle detector 1 shown in FIGS. 1 to 10 includes a rotating member 5, a housing 3, a rotating angle detecting member 11 and a urging member (for example, a torsion coil spring) 7. The rotating member 5 includes a through hole 13, and a shaft member 9 is inserted through the through hole 13, whereby the rotating member 5 is supported integrally on the shaft member 9. Thus, the rotating member 5 rotates together with the shaft member 9. Note that a shaft assembly is made up of the shaft member 9 and the rotating member 5.

The housing 23 is provided integrally on the transmission case and incorporates the rotating member 5 while supporting the rotating member 5 rotatably. By being supported in this way, the rotating member 5 is made to rotate about an axis C1 as a rotating center.

The rotating angle detecting member 11 is made to detect a rotating angle of the rotating member 5 relative to the housing 3. Namely, the rotating angle detecting member 11 includes a rotating angle detection sensor (for example, a magnetic sensor) 15 which is provided integrally on the housing 3 and a detected member (for example, a permanent magnet) 17 which is provided integrally on the rotating member 5 so as to be detected by the rotating angle detection sensor 15.

Then, by the rotating member 5 rotating relative to the housing 3, for example, a pulse signal resulting from rotation of the detected member 17 is obtained by the rotating angle detection sensor 15, and a rotating angle of the rotating member 5 relative to the housing 3 is designed to be detected through the number of pulses so obtained. Namely, an incremental rotary encoder is made up of the rotating angle detection sensor 15 and the detected member 17.

Note that an absolute rotary encoder may be made up of the rotating angle detection sensor 15 and the detected member 17. Then, a rotating angle of the rotating member 5 based on a home position for the rotation of the rotating member 5, may be obtained as an absolute value.

The torsion coil spring 7 is a coil spring for urging the rotating member 5, which rotates relative to the housing 3, in one (a direction indicated by an arrow A3b in FIG. 3) of rotating directions thereof.

An engagement portion 19 is provided on the housing 3 integrally or as in an integral fashion. An engaged portion 21 is provided on the rotating member 5 integrally or as in an integral fashion. Then, by being urged by the torsion coil spring 7, the engaged portion 21 is brought into engagement with the engagement portion 19. The engagement of the engaged portion 21 may be abutment. Thereby, a home position of the rotating member 5, which is a home position of the rotating angle of the rotating member 5 relative to the housing 3, is specified.

In addition, the rotating member 5 is installed inside the housing 3 so as to rotate relative to the housing 3 within a predetermined angle range which is smaller than 360°. Namely, the rotating member 5 is allowed to rotate by the predetermined angle in an opposite direction (a direction indicated by an arrow A3a shown in FIG. 3) to the direction in which the rotating member 5 is urged by the torsion coil spring 7 from a state in which the engaged portion 21 is in engagement with the engagement portion 19 (a state shown in FIG. 3). The predetermined angle is, for example, on the order of 120°.

The housing 3 is made up of a main body portion 23 which is installed on the transmission case as in an integral fashion and a lid portion 25 which is made to be attached to and detached from the main body portion 23 and which is installed on the main body portion 23 as in an integral fashion. By this configuration, the rotating angle detection sensor 15, the rotating member 5 and the torsion coil spring 7 are allowed to be built in an interior of the housing 3.

The engagement portion 19 is made up of a raised portion 27 formed on an inner face of the housing 3, and the engaged portion 21 is made up of a cutout 29 formed on the rotating member 5. The raised portion 27 may be formed on an inner face of the main body portion 23. The raised portion 27 may be a projection projecting into an interior space of the housing 3 from the inner face of the housing 3.

In a case where the lid portion 25 is installed on the main body portion 23 after the rotating angle detection sensor 15, the rotating member 5, and the torsion coil spring 7 are installed in the interior of the main body portion 23 of the housing 3, in the event that a rotating angle of the rotating member 5 relative to the housing 3 falls within the rotating angle range of the rotating member 5, the raised portion 27 enters the cutout 29, and hence, the rotating member 5 does not interfere with the lid portion 25, whereby the lid portion 25 can be installed on the main body portion 23.

Namely, in the event that the rotating angle of the rotating member 5 relative to the housing 3 is out of the rotating angle range of the rotating member 5, the raised portion 27 interferes with a rotating cylindrical portion 35, of the rotating member 5, and hence, the rotating member 5 is not installed properly within the housing 3, projecting partially from the interior of the housing 3, which prevents the lid portion 25 from being installed on the main body portion 23.

In addition, the main body portion 23 of the housing 3 includes a cylindrical portion and a disc-shaped portion which closes one of opening portions of the cylindrical portion and is hence formed into a cylindrical frame-like shape. The lid portion 25 of the housing 3 is formed into a disc shape which can close the other opening portion of the cylindrical portion of the main body portion 23. In addition, a through hole 31 is formed in central portions of the disc-shaped portion of the main body portion 23 and the lid portion 25.

A flange portion 33 is provided on an outer circumferential portion of the main body portion 23 of the housing 3 by which the housing 3 is installed on the transmission case. The raised portion (the projection) 27, which makes up the engagement portion 19, is provided on the disc-shaped portion of the main body portion 23 in a position which is spaced away the through hole 31.

The rotating member 5 includes the rotating cylindrical portion 35 whose outside diameter is smaller than an inside diameter of the housing 3 and shaft cylindrical portions 37 whose outside diameters are smaller than the rotating cylindrical portion 35 and which are provided integrally at both end portions of the rotating cylindrical portion 35 in a direction in which the rotating axis C1 extends.

The shaft cylindrical portions 37 are made up of a first shaft cylindrical portion 37A which projects from one end portion side of the rotating cylindrical portion 35 in the direction in which the axis C1 extends and a second shaft cylindrical portion 37B which projects from the other end portion side of the rotating cylindrical portion 35 in the direction in which the axis C1 extends. The first shaft cylindrical portion 37A and the second shaft cylindrical portion 37B are formed into shapes which are almost the same as each other. In addition, an inside diameter of the rotating cylindrical portion 35 and respective inside diameters of the first and second shaft cylindrical portions 37A, 37B are almost the same as each other, whereby the through hole 13 through which the shaft member 9 extends is formed in the rotating member 5. An inside diameter of the through hole 13 is almost equal to an outside diameter of the shaft member 9.

In addition, as has been described above, the through holes 31 (the through holes whose inside diameters are almost equal to outside diameters of the respective shaft cylindrical portions 37A, 37B) are opened in the main body portion 23 and the lid portion 25 of the housing 3 and these through holes 31 are adapted to be brought into engagement with the respective shaft cylindrical portions 37A, 37B. Thus, by the shaft cylindrical portions 37A, 37B being brought into engagement with the through holes 31 in the main body portion 23 and the lid portion 25, respectively, the rotating member 5 is allowed to rotate relative to the housing 3.

Further, a length of the rotating cylindrical portion 35 is made slightly smaller than a length of a cylindrical interior space of the housing 3. In this embodiment, the length of the rotating cylindrical portion 35 is a dimension thereof in the direction of the axis C1, and the length of the cylindrical interior space of the housing 3 is a dimension thereof in the direction of the axis C1.

In addition, the cutout 29 having a bow-like shape and making up the engaged portion 21 is provided on an outer circumferential portion of the rotating cylindrical portion 35 of the rotating member 5, whereby a flat plane-like portion 39 is formed on a side of the rotating cylindrical portion 35. Then, by the raised portion 27 on the housing 3 being positioned within the cutout 29, the rotating member 5 is designed to rotate relative to the housing 3 within the predetermined rotating angle range. The raised portion 27 is the projection smaller than the bow-like cutout 29. Namely, the rotating member 5 is designed to rotate within the predetermined rotating angle range which extends from a state in which the raised portion 27 on the housing 3 is in abutment with one part of the flat plane-like portion 39 on the side of the rotating cylindrical portion 35 to a state in which the raised portion 27 on the housing 3 is in abutment with the other part of the flat plane-like portion 39 on the side of the rotating cylindrical portion 35.

One end portion of the torsion coil spring 7 is installed in the housing 3 as in an integral fashion, and the other end portion of the torsion coil spring 7 is installed in the rotating member 5 as in an integral fashion.

The torsion coil spring 7 has approximately one to four coils or windings. An inside diameter of the coil is slightly larger than the outside diameter of the rotating cylindrical portion 35 of the rotating member 5, and an outside diameter of the coil is slightly smaller than an inside diameter of the main body portion 23 of the housing 3. In this embodiment, the torsion coil spring 7 has two windings.

The one end portion of the torsion coil spring 7 (one end portion of a metal wire stock of the torsion coil spring 7) projects outwards by a predetermined length in a circumferential direction of a main body portion of the torsion coil spring 7 having a ring shape or a torus shape. In this embodiment, the one end portion projects from a predetermined portion on an outer circumference of the main body portion of the ring-shaped torsion coil spring 7 in a normal direction of the portion.

The other end portion of the torsion coil spring 7 (the other end portion of the metal wire stock of the torsion coil spring 7) projects by a predetermined length from the other predetermined portion on the outer circumference of the main body portion of the ring-shaped torsion coil spring 7 in an axial direction of the main body portion of the torsion coil spring 7. In this embodiment, the other end portion projects in a direction in which the axis C1 at a winding center of coils of the torsion coil spring 7 extends.

Then, the one end portion of the torsion coil spring 7 enters a hole 41 provided in the inner face of the main body portion 23 of the housing 3 so as to be fixed in place in the main body portion 23 of the housing 3. In addition, the other end portion of the torsion coil spring 7 enters a hole 43 provided in the rotating cylindrical portion 35 of the rotating member 5 so as to be fixed in place in the rotating member 5. By this configuration, the rotating member 5 is designed to be urged in the one direction (the direction indicated by the arrow A3b in FIG. 3) of the rotating directions thereof by the torsion coil spring 7. The hole 43 is a through hole which is spaced away from the axis C1 of the rotating cylindrical portion 35 and which extends parallel to the axis C1 of the rotating cylindrical portion 35.

A cutout 45 is formed in the rotating cylindrical portion 35 of the rotating member 5 which is different from the cutout 29 making up the engaged portion 21, and the permanent magnet 17 is provided in the cutout 45. Then, the magnetic sensor 15 is designed to detect the magnetism of the permanent magnet 17. In addition, an input/output terminal 47 of the magnetic sensor 15 is provided in the housing 3.

Here, an assembling procedure of the angle detector 1 will be described.

Firstly, the main body portion 23 of the housing 3 is installed in the transmission case, and the torsion coil spring 7 is installed in the main body portion 23. When they are so installed, a rotating position of the shaft member 9 relative to the transmission case constitutes a home position thereof, and the shaft member 9 is designed to rotate only in the direction indicated by the arrow A3a shown in FIG. 3.

Following this, the rotating member 5 is installed in the housing 3 so that the shaft member 9 extends through the through hole 13. When the rotating member 5 is so installed, the other end portion of the torsion coil spring 7 is inserted into the hole 43 in the rotating member 5, the shaft cylindrical portion 37A of the rotating member 5 is inserted into the through hole 31 in the main body portion 23 of the housing 3 as required, the rotating member is rotated about the axis C1 as required, the raised portion 27 on the housing 3 is made to enter the cutout 29 of the rotating member 5, and the shaft cylindrical portion 37A of the rotating member 5 is pushed further into the through hole 13 in the main body portion 23 of the housing 3.

Following this, the lid portion 25 is installed on the main body portion 23 of the housing 3.

Figure 1:
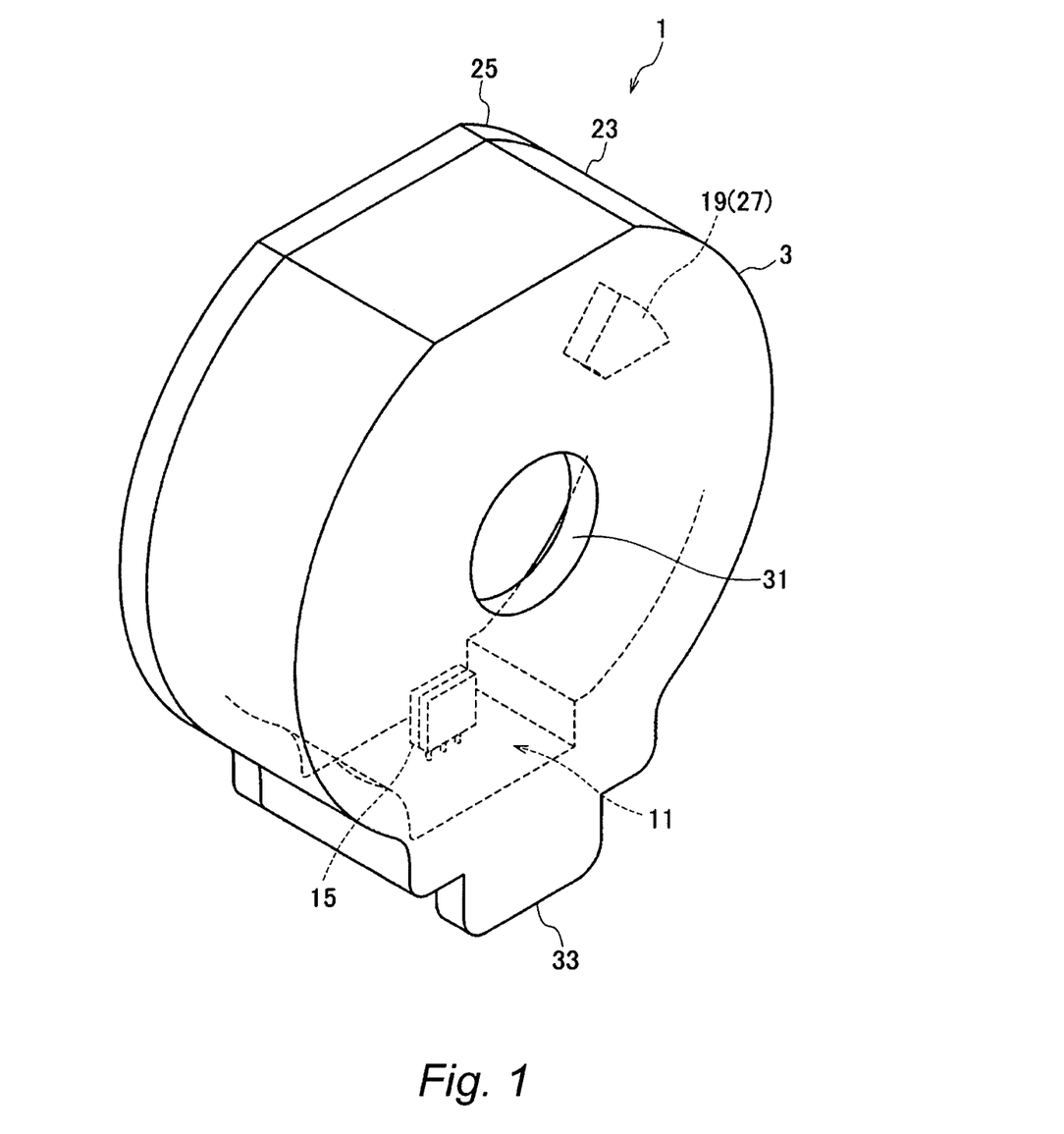
FIG. 1 is a perspective view of a housing of an angle detector according to an embodiment of the invention.
Figure 2:
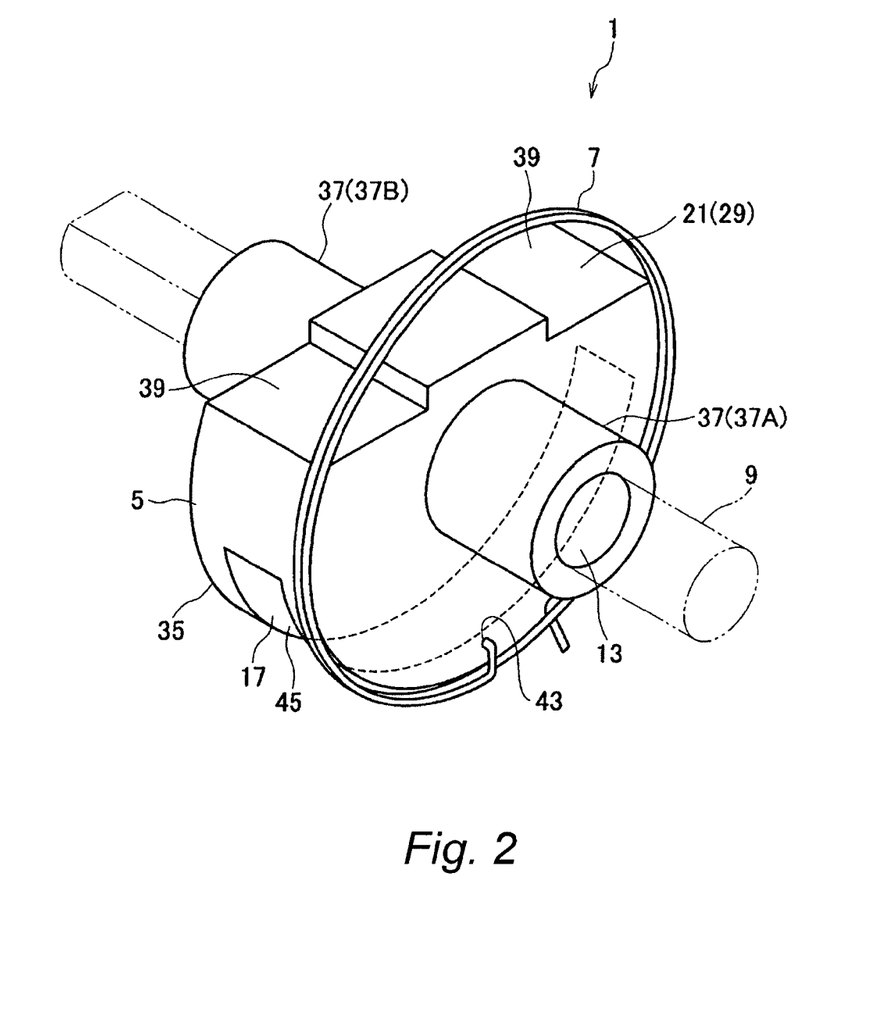
FIG. 2 is a perspective view of a rotating member and a torsion coil spring of the angle detector shown in FIG. 1.
Figure 3:
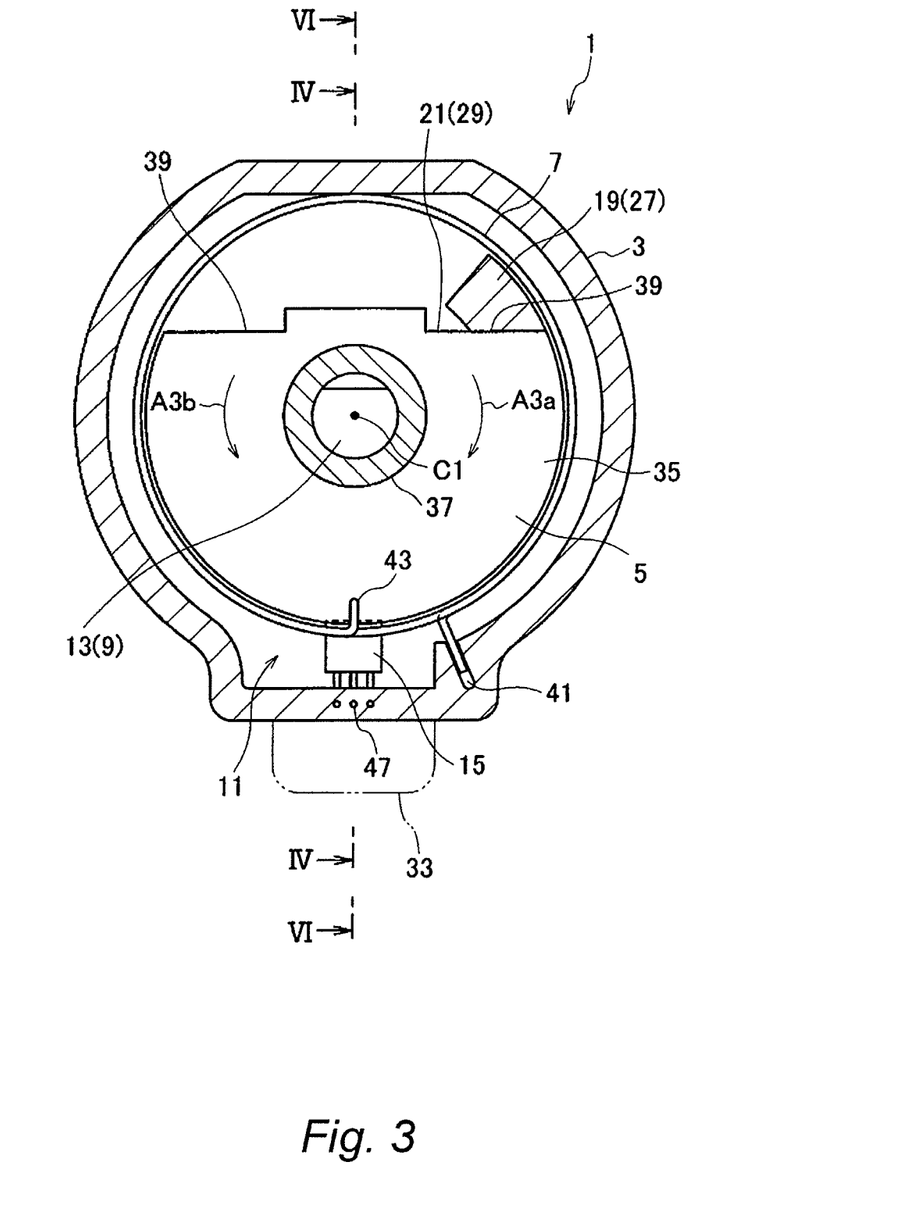
FIG. 3 is a sectional view of the angle detector shown in FIG. 1.
Figure 4:
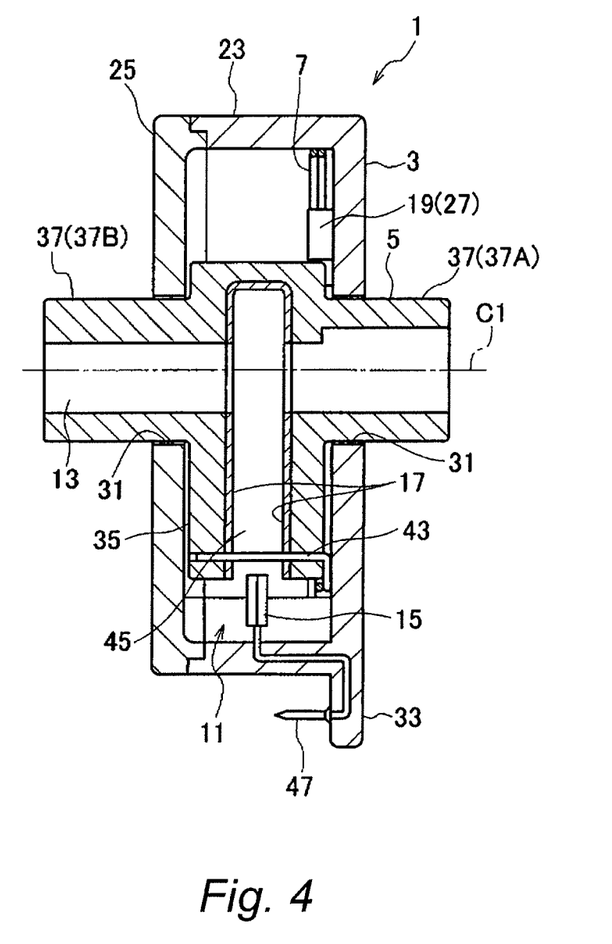
FIG. 4 is a sectional view showing a section taken along the line IV-IV in FIG. 3.
Figure 5A:
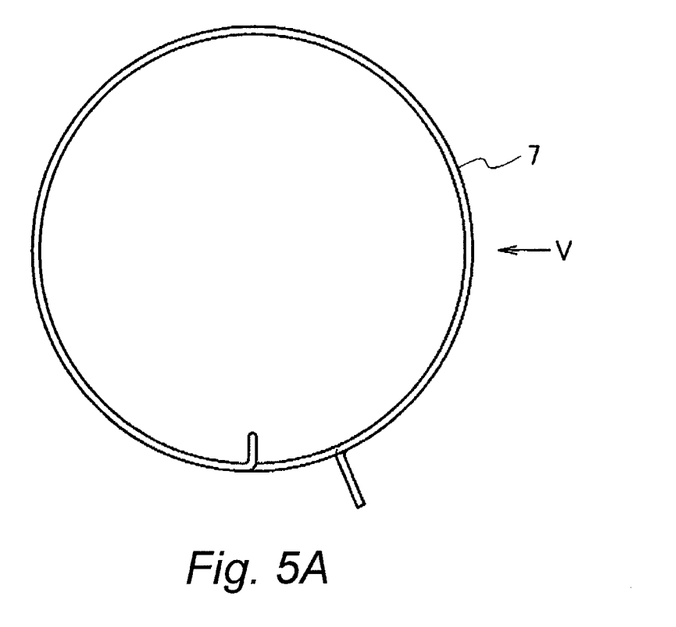
FIG. 5A is a front view of the torsion coil spring used in the angle detector shown in FIG. 1.
Figure 5B:
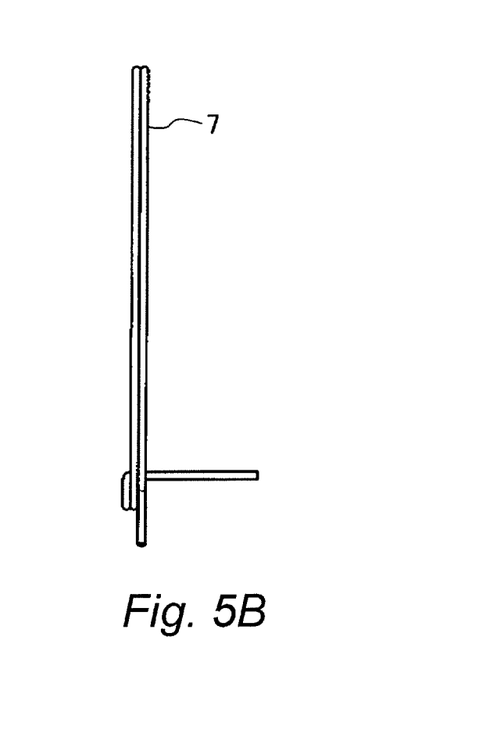
FIG. 5B is a side view of the torsion coil spring used in the angle detector shown in FIG. 1.
Figure 6:
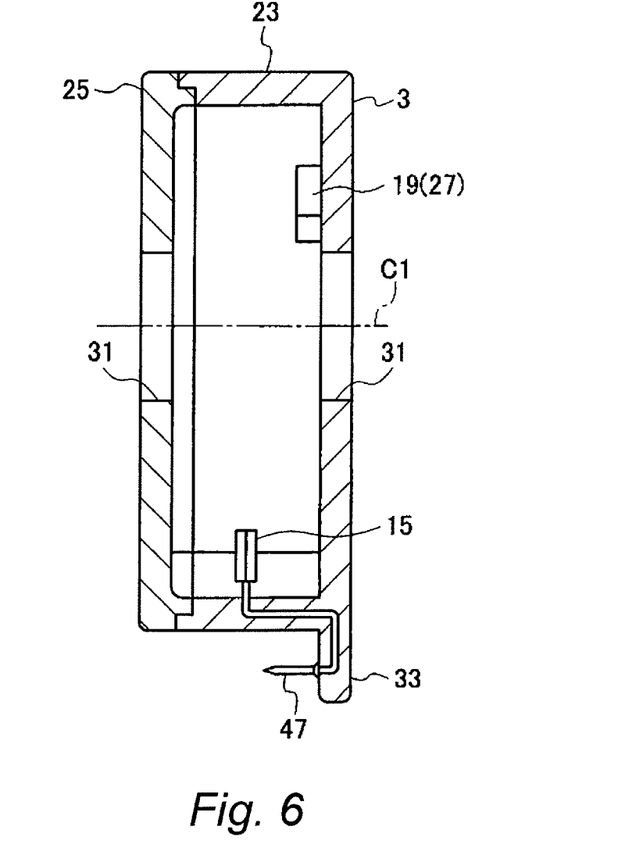
FIG. 6 is a sectional view of the housing used in the angle detector which is taken along the line VI-VI in FIG. 3.
Figure 7A:
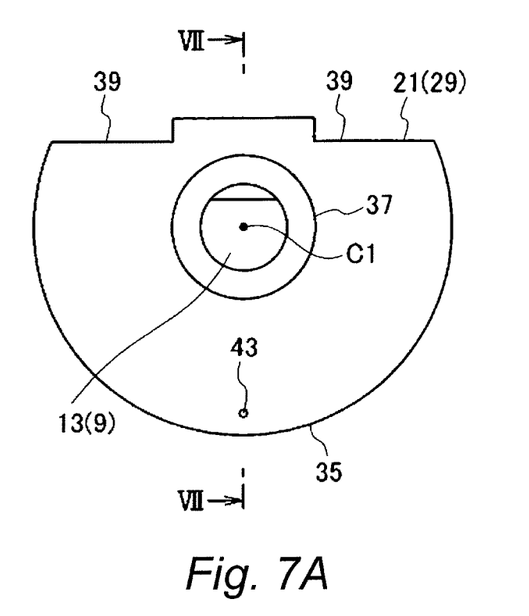
FIG. 7A is a front view of the rotating member which makes up the angle detector shown in FIG. 1.
Figure 7B:
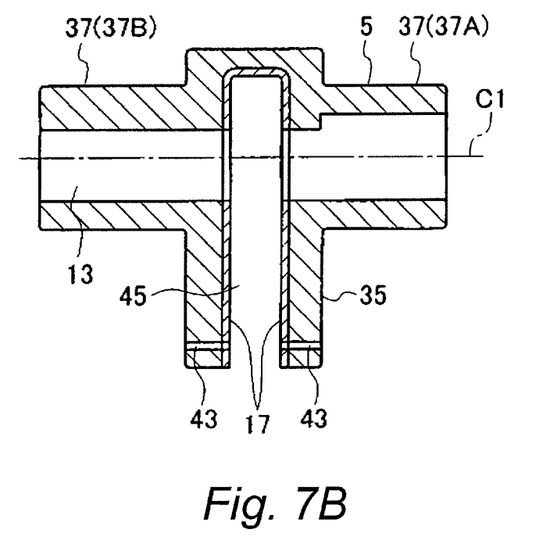
FIG. 7B is a sectional view showing a section taken along the line VII-VII in FIG. 7A.
Figure 8:
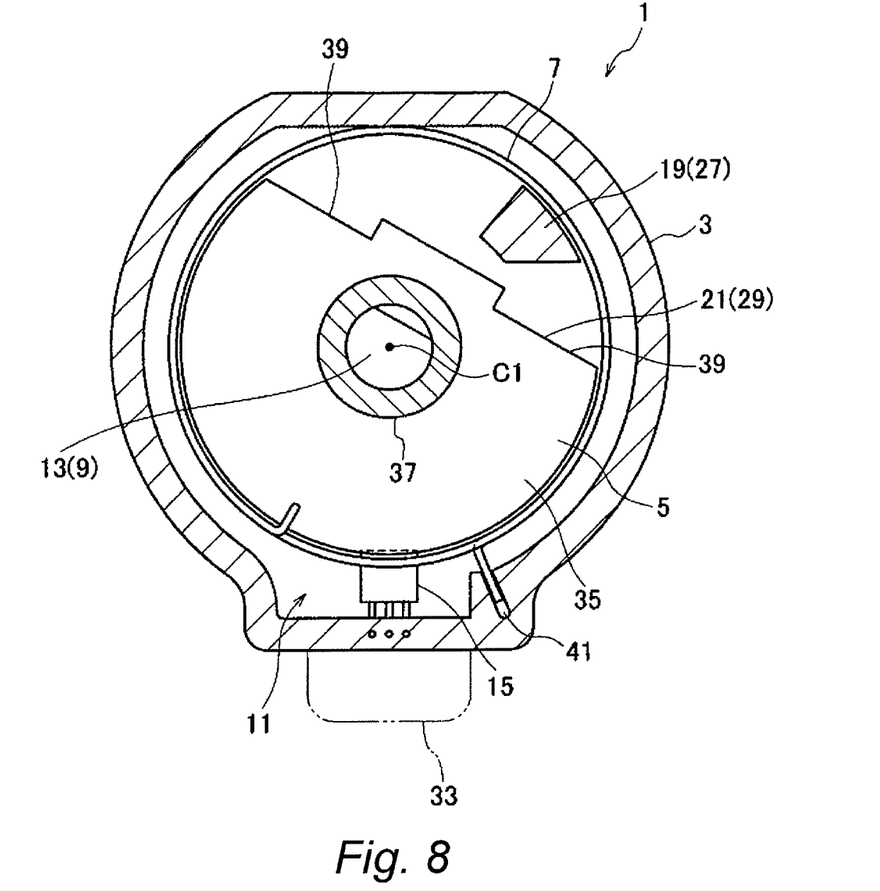
FIG. 8 is a sectional view showing a state in which the rotating member rotates, which corresponds to FIG. 3.

Note that when the rotating shaft 9 (the rotating member 5) rotates in the direction indicated by the arrow A3a shown in FIG. 3 from the state in which the assemblage of the angle detector 1 is completed, a state results which is shown in FIG. 8 (a drawing corresponding to FIG. 3 and showing a state in which the rotating member 5 rotates).

According to the angle detector 1, since the angle detector 1 includes the engagement portion 19 provided in the housing 3 and the engaged portion 21 which is provided in the rotating member 5 and which is brought into engagement with the engagement portion 19 by being urged by the torsion coil spring 7 so as to specify the home position of the rotating member 5, the state does not exist in which the rotating member 206 becomes free in motion as occurring in the related angle detector 200, and the forced home position seeking of the rotating member 5 is implemented by the engagement portion 19 which serves as a stopper and the torsion coil spring 7. Namely, in contrast with the related angle detector, since the software of the control unit of the vehicle does not have to be used in implementing the home position seeking, the software for use in implementing the home position seeking becomes unnecessary, and hence, the angle detector 1 can implement the home position seeking of the rotating member 5 by itself, facilitating the home position seeking operation of the rotating member 5 (the angle detector 1).

In addition, according to the angle detector 1, in a case where the lid portion 25 is installed on the main body portion 23 after the rotating member 5 and the torsion coil spring 7 are installed in the interior of the main body portion 23 of the housing 3, the lid portion 25 is designed to be installed on the main body portion 23 when the rotating angle of the rotating member 5 relative to the housing 3 falls within the rotating angle range thereof. Therefore, a risk can be avoided that the angle detector 1 is built up erroneously.

Additionally, according to the angle detector 1, since the other end portion of the torsion coil spring 7 is designed to fit in the hole 43 opened parallel to the axis C1 of the rotating member 5, the operation of installing the rotating member 5 in the housing 3 after the torsion coil spring 7 is installed in the main body portion 23 of the housing 3 is facilitated. Namely, in the related angle detector 200, when the rotating member 206 is installed in the housing 204 after the torsion coil spring 202 is installed in the housing 204, the other end portion of the torsion coil spring 202 is made invisible by the rotating member 206, and therefore, aligning the other end portion of the torsion coil spring 202 with the recess portion 212 of the rotating member 206 becomes difficult. However, with the angle detector 1, since the other end portion of the torsion coil spring 7 only has to be inserted into the hole 43 provided to extend parallel to the axis C1 of the rotating member 5, the operation of installing the rotating member 5 in the housing 3 after the torsion coil spring 7 is installed in the main body portion 23 of the housing 3 is facilitated.

Figure 9:
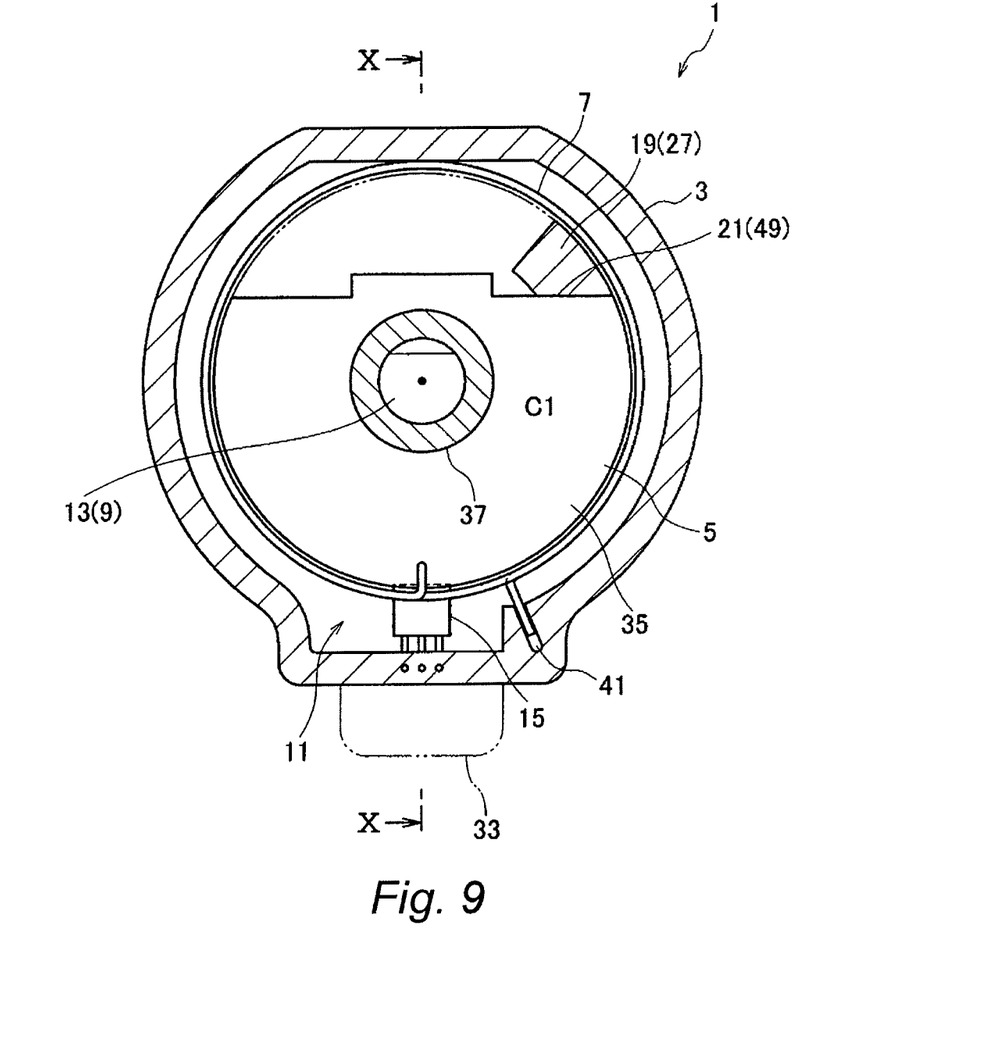
FIG. 9 is a sectional view showing an embodiment in which an engaged portion is made up of a recess portion, which corresponds to FIG. 3.
Figure 10:
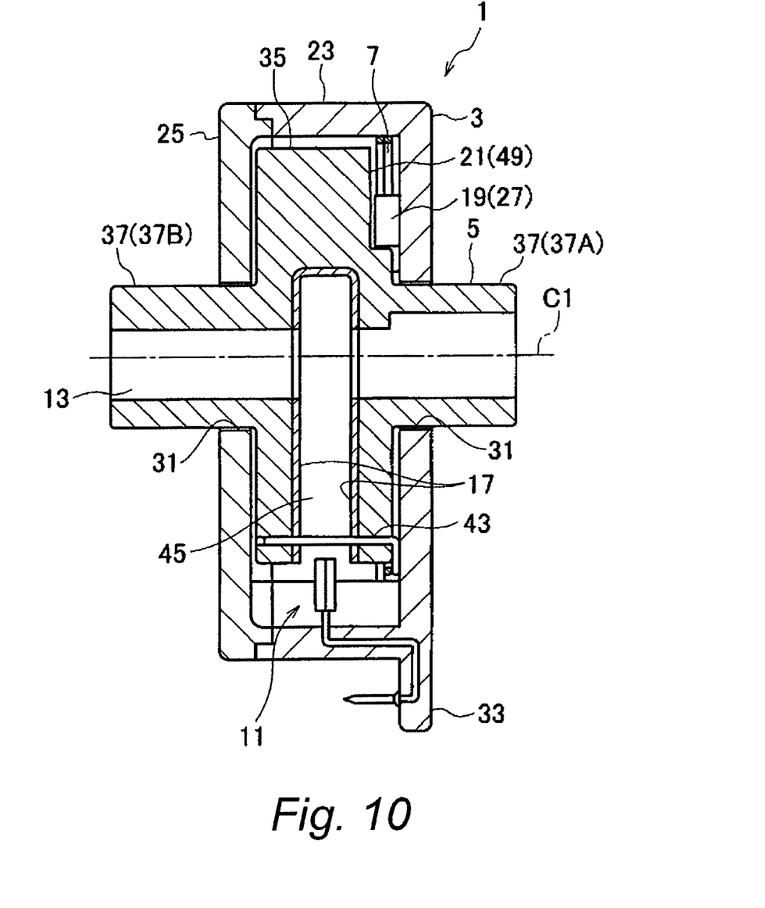
FIG. 10 is a sectional view showing a section taken along the line X-X in FIG. 9.

Incidentally, as is shown in FIGS. 9 and 10, the cutout 29 may be a recess portion 49. In addition, a configuration may be adopted in which a recess portion is provided in the housing 3 to form an engagement portion 19, while a raised portion is provided on the rotating member 5 to form an engaged portion 21.

Namely, the configuration may be adopted in which the engagement portion 19 is made up of the recess portion formed in the inner face of the housing 3 (the recess portion which projects outwards of the housing from the inner face of the housing), and the engaged portion 21 is made up of the raised portion formed on the rotating member 5. Then, in a case where the lid portion 25 is installed on the main body portion 23 after the rotating member 5 and the torsion coil spring 7 are installed in the interior of the main body portion 23 of the housing 3, the lid portion 25 can be installed on the main body portion 23 by the raised portion entering the recess portion when the rotating angle of the rotating member 5 relative to the housing 3 falls within the rotating angle range of the rotating member 5.

Although only some embodiments of the invention have been described in detail above, those skilled in the art will readily appreciated that many modifications are possible in the embodiments without materially departing from the novel teachings and advantages of the invention. Accordingly, all such modifications are intended to be included within the scope of the invention.

The disclosure of Japanese Patent Application No. 2009-177538 filed Jul. 30, 2009 including specification, drawings and claims is incorporated herein by reference in it is entirety.

What is claimed is:

1. An angle detector, comprising:
a rotating member configured to rotate with a shaft inserted therethrough;
a housing rotatably supporting the rotating member;
a detector configured to detect a rotating angle of the rotating member with respect to the housing;
an urging member urging the rotating member in a rotating direction of the rotating member;
an engagement portion provided on the housing; and
an engaged portion provided on the rotating member and configured to be brought into engagement with the engagement portion by urged by the urging member
wherein the urging member is a spring.

2. The angle detector as set forth in claim 1, wherein:
the rotating member is disposed in the housing so as to rotate within an angle range which is smaller than 360 degrees,
the housing includes a main body portion and a lid portion,
the engagement portion has a projection projected from an inner face of the housing,
the engaged portion has a cutout formed on the rotating member, and
the projection is configured to be inserted in the cutout, in a case where the rotating member is angled with respect to the housing within the angle range when the lid portion is attached to the main body portion.

3. The angle detector as set forth in claim 2, wherein:
the urging member includes a torsion coil spring,
one end portion of the torsion coil spring is installed on the housing, and
the other end portion of the torsion coil spring is installed on the rotating member.

4. The angle detector as set forth in claim 3, wherein:
the other end portion of the torsion coil spring is fit in a hole formed on the rotating member parallel to a rotating axis of the rotating member.

5. The angle detector as set forth in claim 1, wherein:
the rotating member is disposed in the housing so as to rotate within an angle range which is smaller than 360 degrees,
the housing includes a main body portion and a lid portion,
the engagement portion has a cutout formed on an inner face of the housing,
the engaged portion has a projection projected from the rotating member, and
the projection is configured to be inserted in the cutout, in a case where the rotating member is angled with respect to the housing within the angle range when the lid portion is attached to the main body portion.

6. The angle detector as set forth in claim 5, wherein:
the urging member includes a torsion coil spring,
one end portion of the torsion coil spring is installed on the housing, and
the other end portion of the torsion coil spring is installed on the rotating member.

7. The angle detector as set forth in claim 6, wherein:
the other end portion of the torsion coil spring is fit in a hole formed on the rotating member parallel to a rotating axis of the rotating member.

8. An angle detector, comprising:
a rotating member configured to rotate with a shaft inserted therethrough;
a housing rotatably supporting the rotating member;
a detector configured to detect a rotating angle of the rotating member with respect to the housing;
an urging member urging the rotating member in a rotating direction of the rotating member;
an engagement portion provided on the housing; and
an engaged portion provided on the rotating member and configured to be brought into engagement with the engagement portion by urged by the urging member,
wherein:
the rotating member is disposed in the housing so as to rotate within an angle range which is smaller than 360 degrees,
the housing includes a main body portion and a lid portion,
the engagement portion has a projection projected from an inner face of the housing,
the engaged portion has a cutout formed on the rotating member, and
the projection is configured to be inserted in the cutout, in a case where the rotating member is angled with respect to the housing within the angle range when the lid portion is attached to the main body portion.

9. The angle detector as set forth in claim 8, wherein:
the urging member includes a torsion coil spring,
one end portion of the torsion coil spring is installed on the housing, and
the other end portion of the torsion coil spring is installed on the rotating member.

10. The angle detector as set forth in claim 9, wherein:
the other end portion of the torsion coil spring is fit in a hole formed on the rotating member parallel to a rotating axis of the rotating member.

11. An angle detector, comprising:
a rotating member configured to rotate with a shaft inserted therethrough;
a housing rotatably supporting the rotating member;
a detector configured to detect a rotating angle of the rotating member with respect to the housing;
an urging member urging the rotating member in a rotating direction of the rotating member;
an engagement portion provided on the housing; and
an engaged portion provided on the rotating member and configured to be brought into engagement with the engagement portion by urged by the urging member,
wherein:
the rotating member is disposed in the housing so as to rotate within an angle range which is smaller than 360 degrees,
the housing includes a main body portion and a lid portion,
the engagement portion has a cutout formed on an inner face of the housing,
the engaged portion has a projection projected from the rotating member, and
the projection is configured to be inserted in the cutout, in a case where the rotating member is angled with respect to the housing within the angle range when the lid portion is attached to the main body portion.

12. The angle detector as set forth in claim 11, wherein:
the urging member includes a torsion coil spring,
one end portion of the torsion coil spring is installed on the housing, and
the other end portion of the torsion coil spring is installed on the rotating member.

13. The angle detector as set forth in claim 12, wherein:
the other end portion of the torsion coil spring is fit in a hole formed on the rotating member parallel to a rotating axis of the rotating member.

* * * * *